United States Patent [19]

Ramirez

[11] 4,219,417
[45] Aug. 26, 1980

[54] WASTEWATER FLOTATION UTILIZING STREAMING POTENTIAL ADJUSTMENT

[75] Inventor: Ernest R. Ramirez, Lemont, Ill.

[73] Assignee: Dravo Corporation, Pittsburgh, Pa.

[21] Appl. No.: 954,359

[22] Filed: Oct. 25, 1978

Related U.S. Application Data

[63] Continuation of Ser. No. 752,908, Dec. 21, 1976, abandoned.

[51] Int. Cl.² ............................ B03D 1/00; C02C 5/02
[52] U.S. Cl. ........................................... 210/44; 210/51
[58] Field of Search .............................. 210/44, 51–53, 210/221 M, 221 P

[56] References Cited

U.S. PATENT DOCUMENTS

| | | | |
|---|---|---|---|
| 3,479,281 | 11/1969 | Kikindai et al. | 210/44 |
| 3,723,712 | 3/1973 | Komline et al. | 210/85 |
| 3,783,114 | 1/1974 | Ishii et al. | 210/44 |
| 3,822,204 | 7/1974 | Sako et al. | 210/44 |
| 3,959,131 | 5/1976 | Ramirez et al. | 210/44 |
| 4,108,768 | 8/1978 | Sebelik et al. | 210/44 X |

Primary Examiner—Thomas G. Wyse
Attorney, Agent, or Firm—Parmelee, Miller, Welsh & Kratz

[57] ABSTRACT

A flow of wastewater is adjusted to near zero streaming potential by injecting a non-coagulant mineral acid or base into the wastewater. The potential is measured in streaming detector units. The thus adjusted flow enters a basin where it is subjected to a decreasing gradient of small bubbles to form and separate off a buoyant floc from which valuable materials are more readily recoverable, a floc of higher solids content, and a floc of lesser relative volume than other systems employing similar manipulative steps.

11 Claims, 5 Drawing Figures

WASTEWATER FLOTATION UTILIZING STREAMING POTENTIAL ADJUSTMENT

This is a continuation of application Ser. No. 752,908 filed Dec. 21, 1976, now abandoned.

This invention relates to an improved method for floating particulates from wastewater.

The use of small diameter bubbles to float impurities from a wastewater has been known as a valuable tool in reducing the level of particulates in municipal and industrial wastewaters. For example, in copending Ramirez, allowed U.S. Ser. No. 636,513, now U.S. Pat. No. 4,012,319 which is hereby incorporated by reference herein, there is disclosed the use of a decreasing gradient of bubble densities to float particulates. This copending application also recognizes that most wastewaters, especially those from meat treating operations or edible oil plants, have one common characteristic which must be overcome in clarifying these wastewaters. These wastewaters contain suspended, charged particulate matter which will not settle out on their own even if allowed to stand for months on end. These particulates usually carry an electrostatic charge, and it is recognized that in order to coalesce these particulates, their charge must be substantially reduced.

In publications such as Komline et al, U.S. Pat. No. 3,723,712 and Carlson, U.S. Pat. No. 3,594,313, negatively charged wastewater particles are reduced to particles having approximately zero charge by adding to the wastewater quantities of coagulants that provide positive charges, such as metal chlorides, sulfates or salts. It is also known, for example from these two patents, that optimum particle charge reduction is accomplished when the zeta potential of the wastewater is adjusted and maintained near a zero lue. Generally, in these publications the metal coagulants serve to neutralize the charge on the particles and then to coalesce them. It is also known that these coalesced particles will form a buoyant floc when brought into contact with small bubbles. The buoyant floc may then be removed from the surface of the thus clarified wastewater. These floc that are removed may be referred to as skimmings. It has been found that systems that use significant amounts of metal coagulants are hampered in their effectiveness by the formation of large amounts of metal hydroxides that are collected in the skimmings. These metal hydroxides unfortunately bind not only the particulates but also substantial quantities of water so that the skimmings contain about 95 percent water, meaning that the solids content of the skimmings is especially low. These binding properties also tend to increase the effort needed to "render" the skimmings when it is desired to recover valuable materials such as minerals, proteins, fats and oils present in the raw wastewater. Metal coagulants also tend to taint the recovered materials with residue from the metal coagulants and result in recovered products that have an undesirable color.

Also, the use of metal coagulants produces a relatively large volume of skimmings, on the order of 2 to 5 volume percent of the wastewater treated. Likewise, the metal coagulants themselves are particulate matter which add to the total suspended solids content of the wastewater. Another disadvantage is that the cost of metal coagulants is high when compared with the cost of non-coagulant inorganic acids or bases.

It has now been determined that acceptable wastewater clarification can be accomplished on certain types of wastewaters by adjusting the streaming potential thereof to near zero by means of a non-coagulant, thereby lessening the difficulties encountered when metal coagulants are used.

It has also been determined that, quite unexpectedly, an embodiment of the method and apparatus of this invention can cause significant reduction in the content of ions in wastewaters by transferring significant amount thereof into the skimmings. While it is believed that this phenomenon itself had been at work, unrecognized, in systems of the type disclosed in said copending U.S. Ser. No. 636,513 and in U.S. Pat. Nos. 3,959,131, 3,969,245, and 3,975,269, this particular embodiment of the present invention accomplishes even better ion removal than that of these systems.

Accordingly, an object of this invention is an improved method for removing appreciable quantities of charged particulates from a wastewater while using no metal coagulants to form a buoyant floc that is readily renderable, of increased solid to liquid ratio, and of reduced relative volume.

It is a further object of the invention to provide an improved method to clarify wastewaters by means of forming buoyant floc having improved color and odor properties.

One other object of this invention is an improved method for clarifying wastewater by separating out buoyant floc containing a large percentage of particulates, while maintaining the volume of floc formed and collected below 2 volume percent of the wastewater treated.

An object of one embodiment of this invention is the provision of a process that accomplishes significant reductions in the content of certain adsorbable ions in wastewater simultaneously with the removal of particulates.

This invention is an improved method for clarifying wastewaters by flotation. A flow of wastewater containing charged particulate matter is adjusted to near its zero streaming potential value by adding a non-coagulant. The adjusted wastewater flow is then directed to a confined location containing dense quantities of small bubbles. The overflow from the confined location enters a flotation zone having a partially baffled flow and also a quiescent zone at its downstream end. Positioned above both the confined location and the flotation zone is a floc removal means, the clarified wastewater exiting downstream of the quiescent zone. In one embodiment, these features are combined with forming the bubbles by electrolytic decomposition of water to accomplish an improved simultaneous passage of ions from the wastewater into the floc.

Additional objects, if not set forth specifically herein, will be readily apparent to those skilled in the art from the detailed description of the invention which follows and from the drawings in which.

Figure 1:
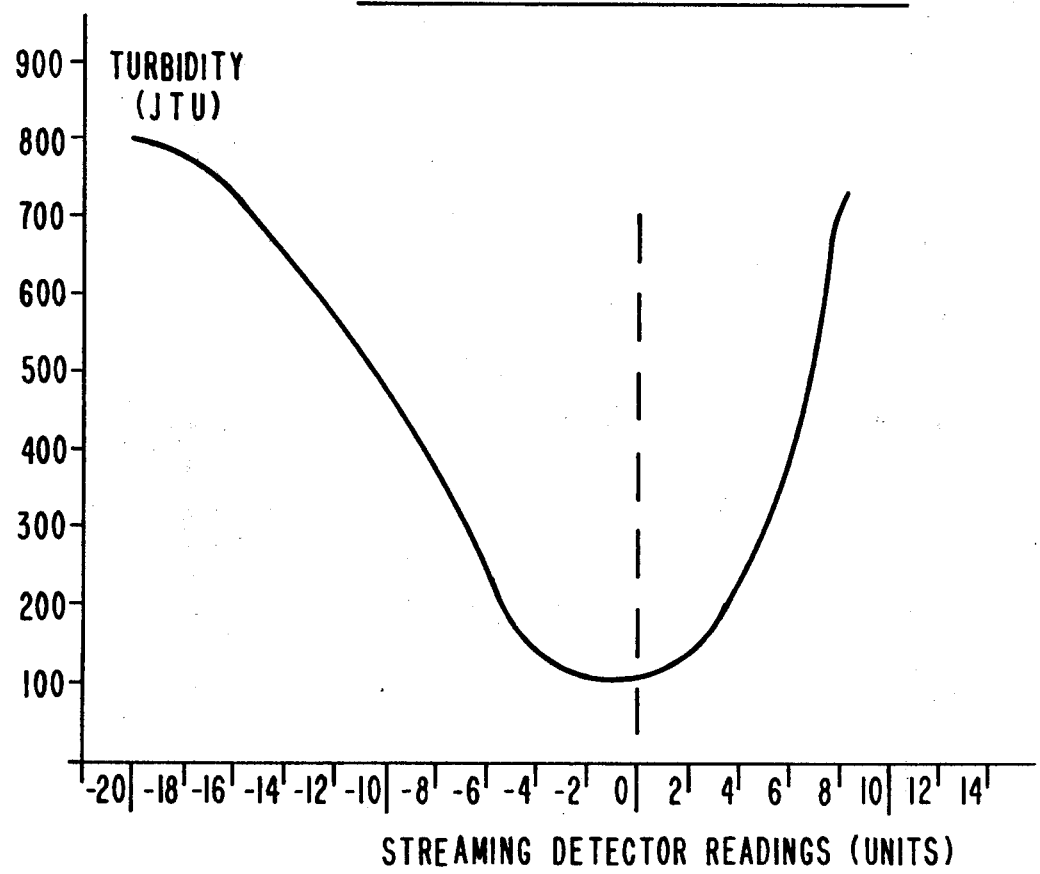
FIG. 1 is a plot of streaming detector readings against turbidity.

The method of this invention accomplishes the removal of charged particulates from a flow of wastewater. The wastewater to be treated is mixed with a quantity of a non-coagulant to adjust the streaming potential to near zero. The thus adjusted wastewater flows into a confined location wherein it is combined with a dense supply of small bubbles that form buoyant gas-particulate composites. The wastewater and composites then flow together upwardly and over an impermeable barrier and into a baffled long flotation zone. The flotation zone preferably provides a steady gradient supply of bubbles, with the greatest quantity of bubbles in the flotation zone being provided adjacent the barrier. The bubble supply quantity gradually diminishes toward the downstream portion of the flotation zone, culminating in the quiescent zone. A clarified wastewater exit communicates with the quiescent zone. Meanwhile, a buoyant floc is formed along the top surface of both the confined zone and the long flotation zone. The floc is directed along said surface toward the confined location, after which it is removed and collected.

The preferred method clarifies waters that have insoluble or insolulizable charged particulates. It is particularly suitable for packinghouse and meat processing wastewaters, especially beef and pork operations, that contain protein, fat and oil particulate materials which carry a measurable charge. Generally, wastewaters having a particulate content that is highly emulsified will not be successfully clarified by this invention. For example, attempts to use this invention to clarify both commercial laundry and tannery wastewaters having a high surfactant content have not been successful. This process is also particularly suitable for insolubilizing and removing dissolved heavy metals, especially from waters used during the beneficiation of metallic ores. Typically, fats and oils particulates and ore beneficiation waters will have a negative streaming potential. Protein particulates will tend to exhibit a positive streaming potential. Almost all wastewaters have a net zeta potential that is negative. It has been found that when a mineral acid is added to a water having insoluble charged particulates, it is brought to approximately zero streaming potential. The preferred mineral acid is sulphuric acid. Other suitable mineral acids include hydrocloric acid. A wastewater that might have a net streaming potential that is positive would call for the addition of a mineral base. It has also been found that streaming potentials of ore beneficiation waters, although they generally are negative, are brought to near zero streaming potential by the addition of a mineral base. The preferred mineral base is calcium hydroxide. Other suitable mineral bases include sodium hydroxide and lime.

With the streaming potential near zero, the particulates are no longer charged or carry only very low charges. This means that the charge repulsion present among the particulates prior to treatment has been removed or at least substantially lessened. Without this adjustment, the particulates will remain dispersed throughout the wastewater and will be resistant to the bubble treatments of the subsequent steps. The streaming potential adjustment markedly increases the tendency of the particulates to unite and grow with the small bubbles to form the floc without having to use metal coagulants.

In the next step of this method, the streaming potential adjusted wastewater flows into the confined location having a continuous supply of bubbles. The density of this supply is such that the bubbles comprise ½ to 6 volume percent of the wastewater in the confined location to efficiently form the buoyant gas-solid composites. These bubbles may be provided by electrolytic decomposition of wastewater or by pressurized gas dissolution and should be in the size of between 30 and 500 microns, preferably 50 to 200 microns in diameter. Dissolved gas bubbles are preferred because of their lower cost and smaller average size.

While dissolved gas is used in the preferred embodiment, an alternate embodiment employs electrolytic bubbles, which have a particular advantage in that they result in a marked reduction in the amount of certain adsorbable ions that might be present in the raw wastewater. Such ions include ammonia-nitrogen, cyanide, phenols, polybrominated biphenyls, and various other organic toxic pollutants. The reduction is significant, with these ion values being enriched in the floc. The degree of reduction is reported elsewhere herein as a partition coefficient, defined as the concentration of ions in the floc phase over the concentration of ions in the mother liquor, here the wastewater. This feature results in a partition coefficient in excess of 30/1.

The reason for this highly beneficial phenomenon is not presently known. The following is offered as an hypothesis. Hydrogen bubbles appear to act as a catalyst in that they attach to the particulates to form the two-phase composites, hydrogen being the gas phase. It is postulated that ions are then adsorbed, either physically, chemically, or by ion exchange, onto the solids at the gas-solid interphase. When these two-phase composites enter the floc later on in this method, these values are thus removed from the wastewater. It is further postulated that some ions that are not so adsorbed are destroyed by electrolytic action.

In an optional step, a polymer flocculant may be added into the confined location while the composites are being formed and before the mixture passes over the impermeable barrier to initiate the separation procedure. This feature is not essential, but it usually noticeably improves the consistency of the overall process by increasing the stability of the composites formed, making them less susceptible to being damaged during the subsequent separation procedure. Any polymer flocculant (anionic, cationic, or monionic) may be used in concentrations between about ½ and 15 ppm. The preferred polymers are polyelectrolytes in the form of polyacrylic acrylamides, which are copolymers of from about 50 to 90 weight percent acrylamides or methacrylamides, and from about 10 to 50 weight percent acrylic or methacrylic acid or water soluble salts thereof. These polymers are characterized by weight average molecular weights of about 2 million and usually the molecular weights range between about 7 to 12 million as measured by light scattering techniques. The preferred concentration range for the polymer flocculant is between about 1 to 3 ppm.

Irrespective of the makeup of the gas-solid composites formed in the preceding steps, the next step in the present method begins the process of separating the two-phase composites from the wastewater. The wastewater and the composites mixed therein flow together out of the confined location by passing over the impermeable barrier into the long flotation zone. Preferably, additional bubbles are provided from the bottom of the upstream portion of the zone for assisting in the flotation separation of the composites. The long flotation zone includes a downstream, or quiescent, portion into which no bubbles are supplied. The volume of microbubbles in the upstream portion is generally about 3 to 10 times the volume of microbubbles in the downstream quiescent portion.

When, as preferred, bubbles are added from near the bottom of the upstream portion, the additional bubbles are preferably supplied by electrolytic decomposition of water. They also may be provided by gases dissolved in water. These bubbles should be provided in a pattern that gradually decreases in density in the downstream direction. Best results have been observed when the decrease is geometric. In any event, the decrease should be such that the bubble density at the upstream end of the long flotation zone is 2 to 5 times greater than the bubble density at the mid-line of the zone.

In an alternative embodiment, no additional bubbles are added at the bottom of the long flotation zone. Instead, excess bubbles are added within the confined location so that significant amounts (preferably about 4 volume percent of the flow) of free bubbles unattached to particulate flow over the impereable barrier and down into the long flotation zone. Substantial quantities of these free bubbles flow toward the bottom of the flotation zone, especially at its upstream end, thereby approximating but not equalling the affect that is achieved by the added gradient bubble supply. As a rough approximation, about 0.4 volume percent of the flow will still be free bubbles at the approximate mid-line of the long flotation zone in this embodiment. This alternate embodiment is assisted greatly by the preferred vertical, perforated baffles of this invention. It is also improved as the sizes of the free bubbles decrease, since smaller bubbles rise slower than large bubbles and are more likely to flow toward the bottom of the zone.

Often the desired bubble density can be achieved by providing the bubbles in a number of stages, preferably in four quartile stages. For example, when the bubbles are supplied electrolytically, one can express the bubble density as the average amount of amperage supplied per square foot of each quartile, calculated based on the floor area covered by the quartile stage. In the preferred quartile arrangement, the first, upstream quartile current density is between about 7.5 to 20 amperes per square foot; in the second quartile it is between about 3.5 to 10 amperes; in the third quartile it is between about 1.5 to 5 amperes; and in the fourth, quiescent quartile, no current is supplied.

Within the long flotation zone as a whole, the mixture passing over the impermeable barrier is separated, the composites rising to the surface to form the skimmings, and the wastewater flowing the length of the zone and out at the downstream end of the quiescent portion. In the preferred process, vertical, perforated baffles are placed transverse to the flow throughout the long flotation zone. The baffles have from about 30 to 80 percent, preferably from 50 to 60 percent uniform free passage therethrough as the wastewater flows downstream through the zone. They significantly reduce turbulence, channelling and back diffusion within the zone which would develop if the baffles were not present and which would cause disruption of the separation process to decrease the final clarity of the wastewater.

Figure 2:
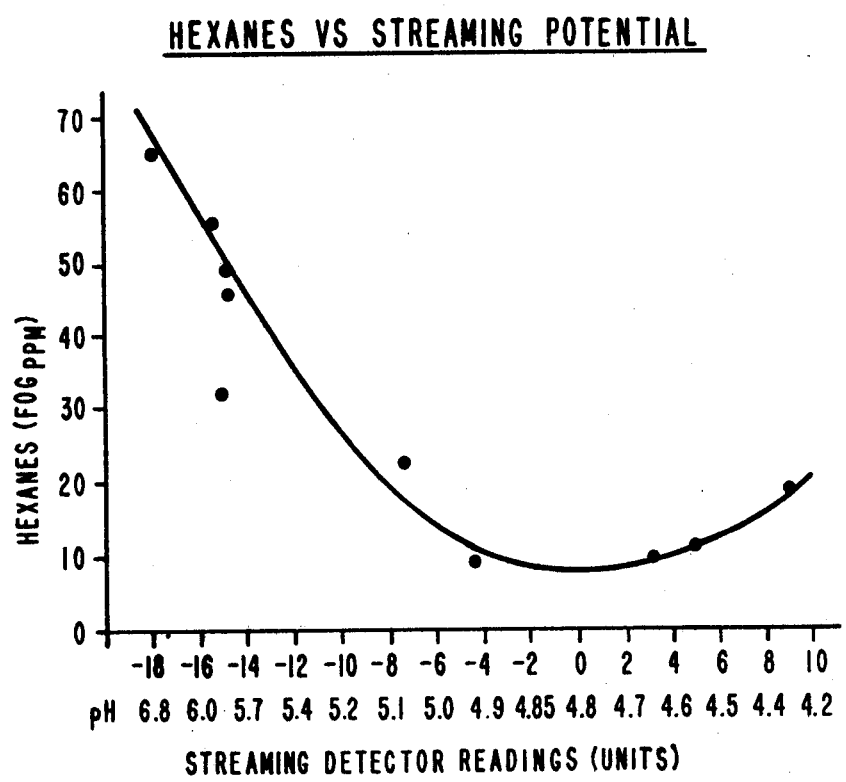
FIG. 2 is a plot of streaming detector readings against hexanes analyses.

FIGS. 1 and 2 illustrate the relationship between streaming potential values and wastewater clarification. The readings are reported in streaming detector units which are qualitative approximations of zeta potential values which were measured on a detector manufactured by Water Associates, Inc. of Framingham, Massachusetts. There is a precise relationship between streaming units and zeta values, disclosed, for example, in *Encyclopedia of Electrochemistry*, editor Clifford A. Hampel, Rehinhold Publishing Corporation, New York, N.Y., 1964, at page 384, incorporated herein by reference.

FIG. 1 illustrates the effects on turbidity (measured in Jackson turbidity units) when a particular meat packing wastewater is treated with sulfuric acid and 12 ampere-minutes per gallon of treated wastewater are applied at various streaming potential units. The greatest clarity results when the streaming potential is zero. FIG. 2 illustrates the effect on hexane extractables or FOG (fats, oils and greases) values when a meat processing wastewater is subjected to treatment according to this process, using 8 ampere-minutes per gallon of wastewater treated, except that streaming potential values other than zero are used. The lowest hexane values occur when the streaming potential meter reading is zero. These figures illustrate that there is a maximization of treatment of these wastewaters at zero streaming potential, with increasingly poorer results occurring when the streaming potential increases, either negatively or positively.

Table I illustrates that there is a wide variation, from wastewater to wastewater between the pH and the streaming potential of the raw wastewater and the pH of that wastewater at zero potential. One would adjust to the pH listed in the last column to adjust to approximately zero zeta potential in accordance with this process.

TABLE I

| General Type of Wastewater | Raw Wastewater pH | Streaming Detector Reading | pH of Wastewater at Near Zero Streaming Current |
| --- | --- | --- | --- |
| Brewery | 3.8 | +2.6 units | 4.2 |
| Beef packing and marinating | 5.0 | +2.2 units | 6.2 |
| Meat packing | 6.5 | −10.0 units | 3.5 |
| Metal processing | 6.5 | −10.0 units | 2.8 |
| Meat packing | 7.0 | −16.6 units | 4.8 |
| Meat packing | 7.0 | −19.4 units | 4.5 |
| Mineral ore beneficiation | 5.8 | −30 units | 9.2 |
| Oil barrel manufacture | 8.2 | −37.0 units | 3.7 |
| Shortening manufacture | 11.5 | −51.0 units | 3.4 |

Figure 3:
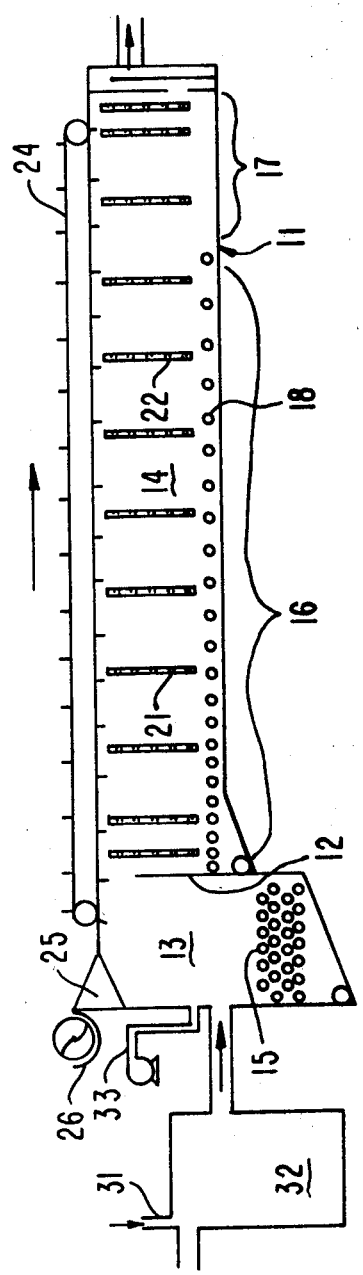
FIG. 3 is an elevation view of the preferred apparatus of this invention.

FIG. 3 is an elevation view of the preferred apparatus, generally indicated by reference numeral 11. Impermeable baffle 12 separates chamber 13 from basin 14. Chamber 13 includes a means, such as electrodes 15, for providing dense quantities of gas bubbles for developing turbulent contacts with particulate matter within chamber 13. The gas bubbles may be supplied in any manner provided they are small enough and dense enough to provide adequate contacts. When electrodes 15 are used, they are preferably provided in two or more staggered rows as depicted in FIG. 3.

Figure 4:
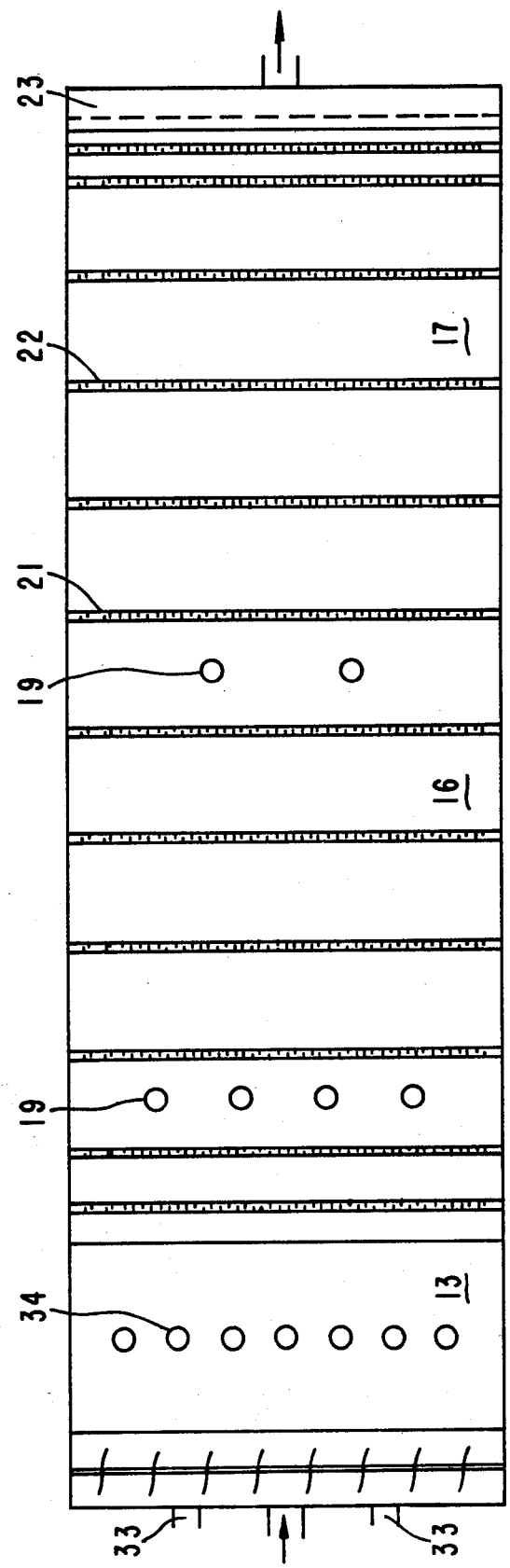
FIG. 4 is a plan view of the preferred apparatus.

Basin 14 has an upstream portion 16 and a downstream portion 17. Upstream portion 16 may include means, such as electrodes 18 to supply bubbles for flotation and separation of composites formed in chamber 13 from the wastewater. No bubbles are added in downstream portion 17; this provides a quiescent environment. The preferred bubble supply means in basin 14 provides bubbles in quantities that decrease in the downstream direction. The object of this structure is separation. The bubbles may be supplied by electrodecomposition of water at electrodes 18 or by releasing pressurized gas dissolved in water through one or more gas pressure release inlets 19 (FIG. 4). One other conventional bubble supply means, dispersion, is presently believed to be an unsatisfactory means for adding bubbles to basin 14.

Perforated transverse baffles 21 are provided through the basin 14. The perforations 22 are generally evenly distributed throughout each baffle 21 and make up about 30 to 80 percent, preferably about 50 to 60 percent, of the surface area of the baffles 21. It is also preferred that these transverse baffles 21 be spaced from each other a distance of approximately ¼ to ½ the width of the basin. Such perforated baffles 21 prevent turbulence, channeling and back diffusion to thereby improve the overall effectiveness of the apparatus. The preferred perforations are circles of diameters between about two inches and three inches. Other sizes and shapes are often adequate, for example, squares of two inches to three inches on each side, rectangles, triangles or other polygons which allow for the specified amount of free passage through the baffles 21.

Downstream of quiescent portion 17 is outlet 23 for passage of the clarified effluent. The floc passes out of basin 14 with the assistance of a floc removal means, such as a skimmer 24, a beach 25 and a trough 26.

Upstream of chamber 13 is injector 31 for introducing chemicals needed to adjust the streaming potential of the wastewater. It is preferred that a holding means, such as hold tank 32, be provided at this approximate location so the streaming potential of the wastewater may be stabilized and verified if desired before subsequent treatment steps. Also present may be one or more injectors 33 which can be used to add a polymer flocculant to increase the size and stability of the buoyant gas-solid composites.

FIG. 4 presents a plan view of the apparatus, with the skimmer 24 and beach 25 having been omitted for clarity. In this figure the means for providing bubbles in chamber 13 takes the form of one or more gas pressure release inlets 34 for releasing pressurized dissolved gas bubbles.

The following Examples are set forth as illustrative embodiments of the invention and are not to be taken in any manner as limiting the scope thereof as defined by the appended claims.

EXAMPLE I

Wastewater from a meat processing plant was analyzed to have the following characteristics: 300 ppm total BOD; 212 ppm FOG; and 240 ppm suspended solids. The pH of the wastewater was measured at 7.5. Streaming potential values (−14 units) taken on this wastewater showed the particles to be negatively. By adding a mineral acid and at a pH of approximately 4.5, the zeta potential, measured as a streaming potential value, was found to be approximately zero. The wastewater then was passed through an electrolytic microbubble cloud to the extent of 5 ampere-minutes per gallon, and the treatment continued for 8 minutes. Analysis of this treated wastewater indicated 120 ppm total BOD; 15 ppm FOG; and 20 ppm suspended solids.

Another portion of this same wastewater, without having been adjusted from its original streaming potential value of −14 units, was also passed through the electrolytic microbubble cloud under exactly the same conditions. The analysis for this treatment indicated 200 ppm total BOD; 80 ppm FOG; and 150 ppm suspended solids.

EXAMPLE II

In a pilot operation carried out at a meat packing plant, raw wastewater flow rates from the plant and through the apparatus of the preferred structure were maintained between 7 and 10 gallons per minute. Approximately 400 ppm of mineral acid was used to keep the streaming potential near zero for this wastewater, the pH ranging between 3.5 and 4.0. Several hours of testing, generating the bubbles with an average of 10 ampere-minutes per gallon of water provided the following data, reported as average values:

| Pollutant | Raw Wastewater | Treated Wastewater | % Reduction |
| --- | --- | --- | --- |
| Total BOD | 1,545 ppm | 100 ppm | 94% |
| Total suspended solids | 1,733 ppm | 110 ppm | 94% |
| Hexane extractables (fats and oils) | 1,572 ppm | 40 ppm | 97% |

Skimmings obtained while conducting these tests had a solids content (100-water content) of 31%; a fat and oil content based on dry solids of 80%; a protein content based on dry solids of 10%; and the skimming volume as a percent of the wastewater process was only 0.34%.

Similar tests were run, these not in accordance with the present invention since zero streaming potential adjustments were not made. Results comparable to those listed in the first part of this Example required the addition of 1,000 ppm of alum, which resulted in the pH of 5.8, followed by 4 ppm of an anionic polymer flocculant. A summary of these results shows that the present process, when operating on a wastewater having high fat content, can be just as effective as one requiring the use of substantial quantities of metal coagulant;

| Pollutant | Raw Wastewater | Treated Wastewater | % Reduction |
| --- | --- | --- | --- |
| Total BOD | 1,545 ppm | 90 ppm | 94% |
| Suspended solids | 1,733 ppm | 100 ppm | 94% |
| Hexane extractables (fats and oils) | 1,572 ppm | 32 ppm | 98% |

The skimmings obtained in this run not in accordance with the present invention were distinctly different from and definitely inferior to those according to the invention. More particularly, the percent solids were substantially lower, only 9.4%; the percent fats and oils were lower, only 60%; the percent protein was lower, only 8%; and the volume of skimmings produced and thus requiring further handling was greater, 0.87%.

EXAMPLE III

Tests were run at a slaughterhouse having a raw wastewater with the following average values of pollutant load; 900 ppm total BOD; 520 ppm suspended solids; and 350 ppm hexane extractables. Using about 200 ppm sulfuric acid, the pH was adjusted within the range of 4.5 to 5.0. A hold tank was not provided and this adjustment had to be made to the wastewater while it was flowing through the system at a rate between 5 and 8 gallons per minute. Within this pH range, the streaming potential as meausred in the laboratory was found to approximately zero. A number of tests were run using bubbles generated electrolytically with between 11 and 14 ampere-minutes per gallon of wastewater. Shortly before entering the long flotation basin of the preferred apparatus, approximately 2.5 ppm of an anionic polyelectrolyte polymer flocculant were added to the flow. These conditions were maintained during 8 hour periods on three different days. An averaged summary of these runs showed that the total BOD was reduced about 67% (to 300 ppm), the suspended solids reduced about 83% (to 90 ppm), and the hexane extractables reduced about 86% (to 50 ppm). The floc collected was found to contain 26% solids, 63% fat (dry basis), and 18% protein (dry basis), and to have a tallow color of 12, a tallow percent moisture of 0.16, a percent unsaponifiables value of 0.07, and a volume percent floc of wastewater treated of only 0.39%. The floc was rendered with very favorable results.

EXAMPLE IV

Figure 5:
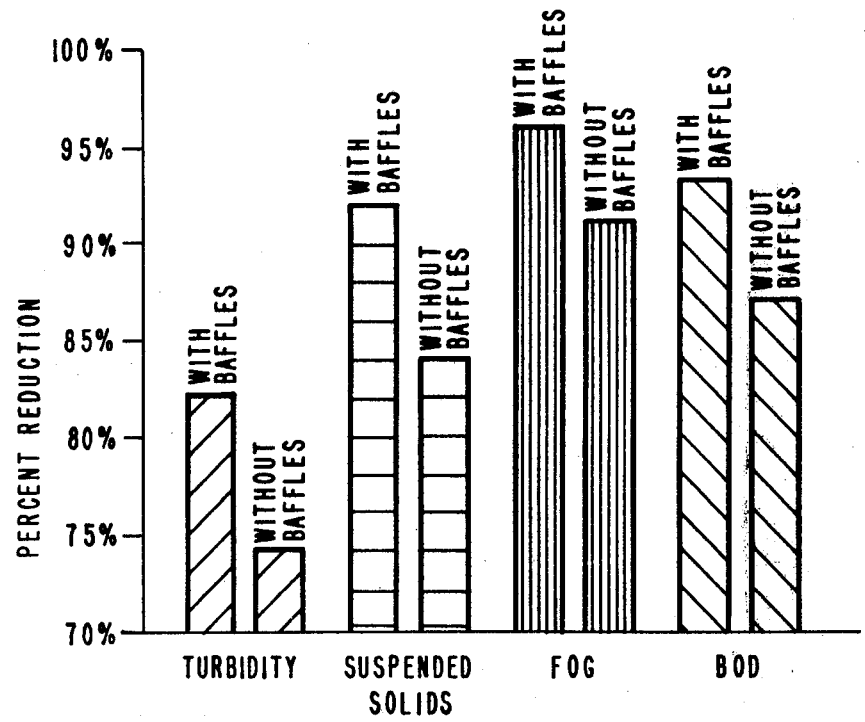
FIG. 5 is a bar graph representation of the tests reported in Example IV.

Wastewater flows from a cattle and hog slaughtering plant had the following average pollutant loads: 5,080 ppm total BOD; 2,750 ppm suspended solids; and 1,950 ppm hexane extractables. The water was treated on a pilot plant scale at a flow rate of 10 gallons per minute and using 14 ampere-minutes per gallon of wastewater treated. One series of tests were run without baffles in the flotation basin, while another series was run with baffles in the basin, there being eleven perforated baffles having 1½ inch diameter holes providing 50% free passage through the perforated baffles. The results, plotted in FIG. 5, show the improvement in final results achieved when the perforated baffles were employed. Also, with the baffles used, the skimmings included 33% solids and 42% hexane extractables.

EXAMPLE V

Two and one half weeks of pilot experimentation were carried out at a pork slaughterhouse plant. The raw wastewater flow was split so as to permit tests to be run on a raw wastewater especially high in fat content, this being a wastewater from the slaughter floor only. After proceeding with the process of this invention, the following summary of analyses were accumulated. The total BOD was reduced 76% (from 1,442 ppm to 346 ppm). The suspended solids were reduced 86% (from 881 ppm to 120 ppm). The hexane extractables were reduced 89% (from 482 ppm to 53 ppm). The ammonium ion concentrations were reduced 63% (from 18.9 ppm to 7.0 ppm). The ammonium ion removal is believed to be of note, since it represents an improvement over the approximately 50% maximum reductions obtainable under similar processes that do not adjust to zero streaming potential.

In this particular series of tests, the zero streaming potential was found to occur at a pH of 4.5. The energy input was 12 ampere-minutes per galllon of wastewater treated, and 2 ppm of an anionic polymer flocculant were added. The tests were run over two 8 hour periods on two different days.

EXAMPLE VI

In the same pork slaughtering plant operation of Example V, similar tests were run, except that the bubbles were provided by dissolved air, with the streaming potential being adjusted to near zero (at a pH of 5.0). Reductions in total suspended solids and hexane extractables were achieved over the same process when run without adjusting to near zero streaming potential. At the same time, the renderability of the floc was found to be quite acceptable. The floc itself contained approximately 20 weight percent solids and 15 weight percent fat.

EXAMPLE VII

Beef packinghouse wastewater, before being passed through a 20 gallon per minute pilot plant in accordance with this invention, had the following characteristics: 1,010 ppm total BOD: 750 ppm total suspended solids; 400 ppm hexane extractables; and 30 ppm ammonia-nitrogen. This wastewater was adjusted to near zero streaming potential, the pH being at a value of 4.5. Using Duriron electrodes provided with an energy input of 10 ampere-minutes per gallon of wastewater treated, a floc floated on the treated wastewater. The treated wastewater had the following characteristics: 310 ppm total BOD; 90 ppm total suspended solids; 50 ppm hexane extractable; and 8 ppm ammonia-nitrogen. Analysis for ammonia-nitrogen in the floc showed a 610 ppm content. This amounts to a partition coefficient of ammonia-nitrogen equal to 76/1. More than 70 percent of the ammonia-nitrogen in the raw wastewater was concentrated into the floc leaving only approximately 30 percent of the original ammonia-nitrogen in the treated wastewater.

EXAMPLE VIII

A pork packinghouse wastewater with the following characteristics was treated in the 20 gallon per minute pilot plant of Example VII: 1,442 ppm total BOD; 881 ppm total suspended solids; 482 ppm hexane extractables; and 19 ppm ammonia-nitrogen. This raw wastewater had a pH of 7.8. This wastewater was adjusted to near zero streaming potential with sulfuric acid, the pH reading being about 4.5. It was then passed through an electrolytic cell where Duriron electrodes were employed and wherein energy input of 11 ampere-minutes per gallon was applied. This resulted in only a 0.4 volume percent of the wastewater treated being converted to floc. Dwell time of the wastewater in the electrocoagulation apparatus was 30 minutes. The chemical characteristics of the wastewater leaving the pilot unit were: 350 ppm total BOD: 120 ppm total suspended solids; 53 ppm hexane extractables; and 7 ppm ammonia-nitrogen. Reduction in ammonia-nitrogen values in the effluent wastewater as compared to the raw wastewater was noted to be 63 percent. The value of ammonia-nitrogen content in the floc was observed to be 530 ppm. The partition coefficient for ammonia-nitrogen was 75/1.

EXAMPLE IX

Packinghouse wastewater containing 42 ppm of ammonia-nitrogen was treated with sulfuric acid to bring it to its zero streaming potential, which was found to be at a pH of 4.5. This wastewater was then treated with 11 ampere-minutes per gallon of electrolytic current wherein 90 percent of the suspended material was removed from the wastewater in the form of skimmings. Analysis of the wastewater treated showed the ammonia-nitrogen value was reduced to 3.7 ppm. This corresponds to a 91 percent reduction in ammonia-nitrogen values of the treated wastewater.

EXAMPLE X

Wastewater used for the beneficiation of molybdide ores had a streaming potential reading of about −20 units, had a pH of 5.8, and contained appreciable amounts of dissolved heavy metals and 0.7 ppm of cyanide values. This water was treated with 150 ppm of lime to adjust the streaming potential to near zero (about −10 units), the pH increasing to about 9.1. It was then processed with a total of 8 ampere-minutes per gallon of water treated, which processing included the addition of 2 ppm of a polyacrylic acrylamide copolymer flocculant. Analysis of the effluent waters showed that more than 90 percent of the heavy metals (copper, zinc, cadmium, iron, manganese) were insolubilized and removed, and that the cyanide value of 0.7 ppm was reduced to 0.08 ppm, an 88 percent reduction.

Obviously, many modifications and variations of the invention as hereinbefore set forth may be made without departing from the spirit and scope thereof, and only such limitations should be imposed as are indicated in the appended claims.

I claim:

1. A method for removing particulates from wastewaters by flotation, comprising: obtaining a supply of wastewater having charged particulate matter; adjusting the streaming potential of particulates in the wastewater to approximately zero, in the absence of any added trivalent metal coagulant compounds, by adding to the wastewater a non-coagulant chemical consisting essentially of an inorganic mineral acid or base; forming a flow path of the thus adjusted wastewater to a confined location; supplying dense quantities of small bubbles within said confined location; entering overflow from the confined location into a long flotation zone; baffling the overflow by flowing through perforated baffles in said flotation zone; said flotation zone having a downstream, quiescent portion; forming buoyant floc in the long flotation zone; and separating the floc from the wastewater.

2. The method of claim 1, wherein the non-coagulant chemical is an inorganic acid and the wastewater is a packinghouse or meat processing wastewater having protein, fat and oil particulate matter.

3. The method of claim 1, wherein the non-coagulant chemical is an inorganic base and the wastewater is a water used in the beneficiation of mineral ores, said water having insolubilizable, dissolved heavy metals.

4. The method of claim 1, wherein the baffling reduces turbulence, channelling and back diffusion by permitting free passage of about 30 to 80 percent of the flow through the long flotation zone.

5. The method of claim 1, said wastewater also including certain adsorbable ion values, said bubbles in said confined location being supplied electrolytically, and at least 50 percent of the ions being removed from the wastewater.

6. The method of claim 1, further comprising adding about one half to 15 ppm of polyelectrolyte flocculant to the confined location.

7. The method of claim 1, wherein the steps of forming and separating buoyant floc includes supplying bubbles formed electrolytically or by release of pressurized dissolved gas bubbles within the portion of the long flotation zone that is upstream of the quiescent portion, the volume of microbubbles present in the wastewater of said upstream portion of the long flotation zone being about 3 to 10 times greater than the volume of microbubbles in the downstream quiescent portion.

8. The method of claim 1, wherein the steps of forming and separating buoyant floc in the long flotation zone includes providing bubbles in a pattern that gradually decreases in density in the downstream direction.

9. The method of claim 1, wherein the steps of forming and separating buoyant floc includes forming bubbles electrolytically and supplying said bubbles in four quartile stages, the stage at the first, most upstream stage of the long flotation zone having a current density between about 7.5 to about 20 amperes, the second quartile stage having a current density between about 3.5 to about 10 amperes, the third quartile stage having a current density between about 1.5 to about 5 amperes, and the fourth, most downstream stage being said quiescent portion within which no current is supplied, said current densities being the average amount of amperage supplied per square foot of each quartile, calculated based on the floor area covered by each quartile stage.

10. The method of claim 1, wherein the steps of forming and separating buoyant floc include supplying bubbles within the long flotation zone to develop a bubble density at the upstream end of the long flotation zone that is 2 to 5 times greater than the bubble density at the mid-line of the zone.

11. The method of claim 1, wherein said steps of supplying dense bubbles, entering the long flotation zone, baffling, forming buoyant floc and separating floc together provide a gradient of bubble densities that gradually diminish in density along said flow path, the greatest density being at the influent end of the flow path; contacting said flowing wastewater with said gradually diminishing gradient; and creating high water turbulence within the wastewater only at the influent end, said high water turbulence being created and maintained within the confined location by the dense quantities of small bubbles formed by said influent end greatest bubble density.

* * * * *